Jan. 13, 1942.        E. BAGNALL        2,270,029
DEFLECTOR
Filed June 30, 1939
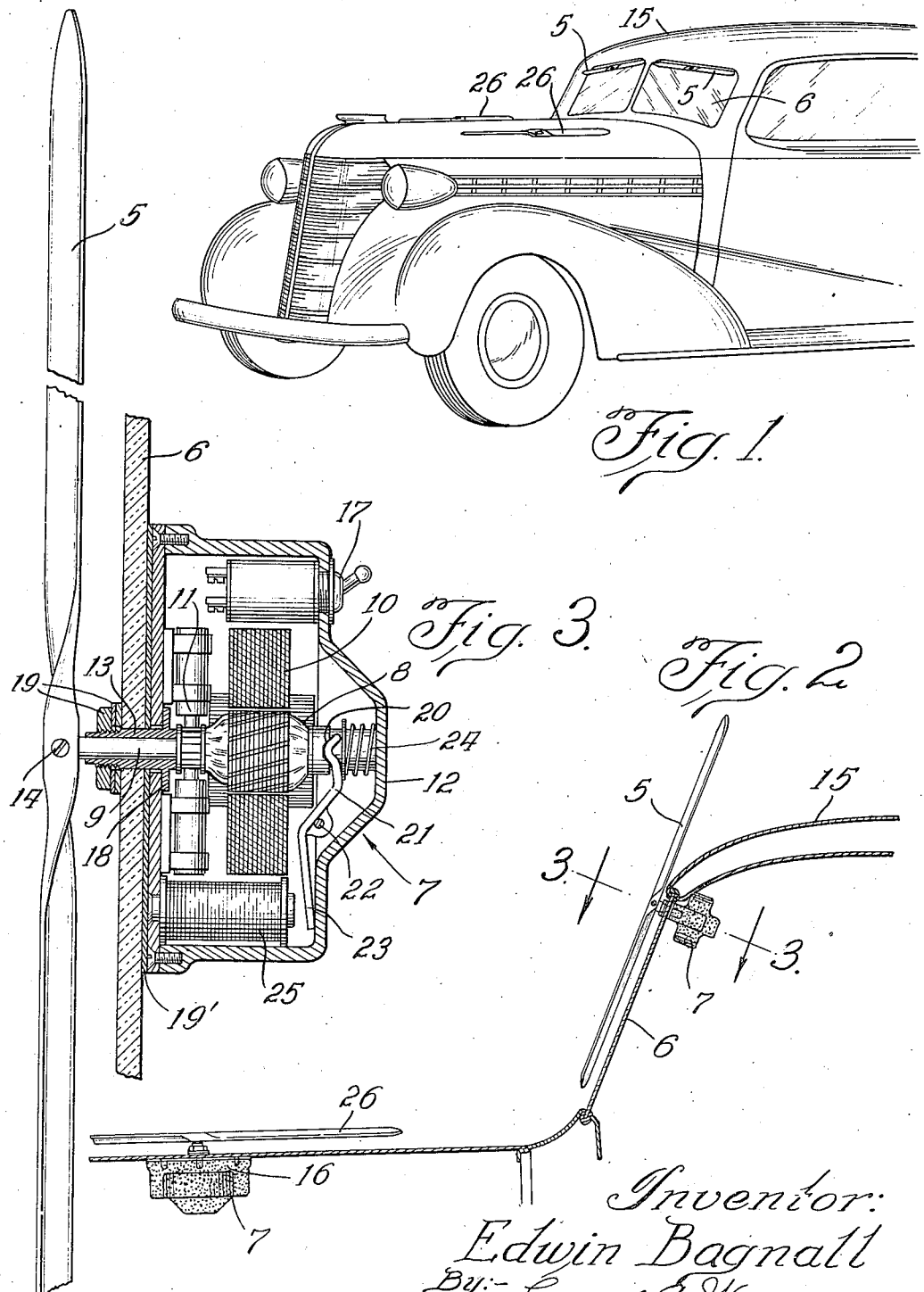
Inventor:
Edwin Bagnall Patented Jan. 13, 1942

2,270,029

UNITED STATES PATENT OFFICE 2,270,029

DEFLECTOR

Edwin Bagnall, Chicago, Ill., assignor of one-fourth to Martin Tanner, Chicago, Ill.

Application June 30, 1939, Serial No. 282,100

9 Claims. (Cl. 296—91)

The invention relates generally to a deflector and more particularly to an air current generating deflector.

Even drivers of vehicles such as buses and street cars, but particularly drivers of automotive vehicles, are still confronted with at least two hazardous driving conditions for which no satisfactory solution has yet been found. One of these confronts the driver in the winter and resides in the formation of ice on the exterior of the windshield while driving in sleet or rain in cold weather, or the coating of the exterior of the windshield with snow, particularly while driving in a snow storm when the snow is comparatively wet. The ice coating on the exterior of the windshield so diffuses the rays of light passing therethrough that objects cannot be clearly seen and the snow frequently obscures all vision entirely. While means have been devised for maintaining the interior of the windshield, or at least a portion of the interior of the windshield, free from condensed moisture, no completely effective and satisfactory means has yet been devised for keeping the exterior of the windshield free from ice and snow. When driving under such conditions, the operator of the vehicle either must assume the hazard of driving with his vision thus obscured, or make frequent stops and scrape or thaw the snow or ice from the exterior of the windshield.

The other condition exists in the summer and resides in the numerous insects which, particularly at night, are attracted by the lights of the automotive vehicle and then strike against the windshield causing the windshield rapidly to become so coated as to cause driving to be hazardous, particularly against the lights of approaching cars. When the windshield is soiled in this manner, not only is the clear vision of the operator of the vehicle impaired, but the operator cannot even stop on the highway and clean the windshield, for customarily the spot caused by the smashing of an insect against the windshield requires at least water and frequently some special compound for effectively removing the spot and leaving the windshield clear.

It is, therefore, a general object of the invention to provide new and improved means of unique design for maintaining sleet, snow or insects from obscuring the vision of the driver of the automotive vehicle.

A more particular object of the invention is to prevent the vision of the driver of an automotive vehicle from being obscured by preventing sleet, snow or insects from striking the windshield of the automotive vehicle.

Yet another object of the invention is to provide in an automotive vehicle an air current generating deflector, which may be so mounted on the automotive vehicle as to cause sleet or snow particles, or insects, to be deflected away from the windshield and thus prohibit coating of the windshield because the particles or insects never strike the windshield.

Still another object is to provide such an air current generating deflector which in itself does not obscure the vision of the operator of the vehicle while in operation, and which, moreover, enhances the beauty of the automotive vehicle or at least does not detract from its appearance.

A further object is to provide such a deflector which may be easily and readily installed on automotive vehicles which are now in use, as well as on newly manufactured vehicles.

Other objects and advantages will become apparent from the following detailed description taken in connection with the accompanying drawing, in which:

Fig. 1 is a partial perspective view of an automotive vehicle equipped with deflectors of the character described.

Fig. 2 is a longitudinal sectional view of the motor vehicle shown in Fig. 1, taken in a plane passing adjacent the points at which the deflectors are attached.

Fig. 3 is an enlarged sectional view of a deflector and its driving motor taken along the line 3—3 of Fig. 2.

While for purposes of disclosure the invention has been shown in the drawing as used in conjunction with an automotive vehicle, and while it will in the following specification be described in that environment, it is to be understood that the invention is not to be limited to the construction or adaptation shown, but that it may also be used in conjunction with other vehicles, such as buses, street cars, etc., or even in conjunction with stationary devices having windows, all as falling within the spirit and scope of the invention as defined by the appended claims.

Generally the deflector comprises means setting up an air current and so mounted with respect to the area to be maintained clean as to cause sleet, snow or other particles and insects to be deflected away and thus prevented from striking the area. Accordingly, deflector means is provided which directs an air current generally at right angles to the plane of the area to be protected and, in an automotive vehicle such as depicted in the drawing, this means that the air current is directed generally forwardly and slightly upwardly, as best seen in Fig. 2. Additional deflector means is provided which, in the present instance, directs an air current generally vertically. This deflector means is most effective for preventing insects from striking the windshield, for usually these insects are flying horizontally and thus are most easily prevented from striking the windshield by causing their course of flight to be deflected upwardly over the top of the vehicle. The first mentioned deflector means is effective to prevent the vertically falling or obliquely falling sleet or snow particles from striking the windshield, and may or may not be aided by the other deflector means.

Each air current generating means comprises one or more fans or propellers 5. In the case of the means for producing the forward and upward air stream, while a single propeller 5 may be employed, preferably two propellers are employed, one for each half of the windshield 6. This is particularly true where the windshield is a divided windshield, as shown in Fig. 1. Each of the propellers 5 is made as narrow as possible, consistent with the necessary strength and efficient operation, in order that it may be as inconspicuous as possible when stationary and may cause the minimum of interference when rotating. As best seen in Figs. 1 and 2, the propeller is slightly shorter than twice the width of the windshield 6, and with this dimension will correspond favorably in length to the length of one-half of the divided windshield 6.

Each propeller 5 is driven by suitable power means which, in the present instance, takes the form of an electric motor 7. As clearly seen in Fig. 3, this motor comprises an armature 8 fixed on a rotatably mounted shaft 9, a field winding and a core 10, and commutator brushes 11, all housed within a suitable casing 12. One end of the shaft 9 projects outwardly of the casing 12 through a sleeve 13 and at its extreme outer end has secured thereto, by means of a set screw 14, the propeller 5.

As previously stated, and as best seen in Figs. 1 and 2, the propeller and its driving motor are mounted in the top of each half of the divided windshield immediately adjacent the top 15 of the automotive vehicle. To facilitate the mounting of the propeller 5 in the position shown, the casing 12, though in the main being round, as best seen in Fig. 2, has a flattened portion 16 opposite the brushes 11 which permits the housing to fit up close to the inner edge of the top 15. The motor is controlled by a switch 17 which also is mounted within the casing at one end of the flattened portion 16, in conformity with the plan to make the casing 12 long instead of deep so that it may be mounted at the top of the windshield, as shown in Fig. 2. To secure the propeller and casing in place is a simple matter, and thus enables the invention to be used either with newly built cars or to be quickly and conveniently added to cars which have already ben sold. To mount the means, an aperture is drilled in the windshield 6, which then has projected therethrough the shaft 9 and the sleeve 13. The sleeve 13 and the housing 12 are securely clamped onto the windshield by means of an annular flange 18 formed on the sleeve 13 at its inner end where it engages the housing 12 and a plurality of lock nuts 19 threaded onto the outer, projecting end of the sleeve. Preferably a thin sheet 19' of some suitable material, such as felt, cork or rubber, is interposed between the casing 12 and the windshield to eliminate rattling and scratching.

It is desirable, of course, that the propeller 5 used for protecting the windshield should maintain a stationary and preferably horizontal position when not in use. To that end there are formed in the inner end of the shaft 9 diametrically oppositely disposed notches 20. Riding on this notched end of the shaft 9 are the fingers of a yoke 21 pivoted on a pin 22 and having an extension 23. The fingers 21 are urged toward engagement with the notches 20 by means of a compression spring 24, while the extension 23 serves as an armature cooperating with a solenoid 25 located in an extension of the flattened portion 16 opposite the switch 17. The solenoid 25 is connected in parallel with the motor so as to be energized when the motor is operating and deenergized when current to the motor is cut off. Thus, when the solenoid 25 is energized, the fingers 21 will be withdrawn from the notches 20, whereas when the solenoid is deenergized they will be urged toward engagement with the notches by the compression spring 24 as stated. The edges of the notches and the portion of the fingers received in the notches are beveled so that the fingers may overrun the notches while the propeller 5 is still rotating rapidly and has substantial momentum. However, as the momentum of the propeller 5 decreases, the spring 24 will force the fingers into the notches and hold the propeller stationary. These notches are so disposed with respect to the propeller that it will be held in horizontal position, as shown in Fig. 1. With the propellers 5 retained in horizontal position immediately beneath the edge of the top 15, they do not interfere with the vision of the operator of the vehicle and they also present an attractive and inconspicuous appearance. This is particularly true where the propellers are made of some bright non-corrosive material such as nickel or chromium.

The propeller 5 is intended to be rotated at high speed, somewhere in the neighborhood of 3600 R. P. M. in order, first, that it may create an air current which is strong enough to effect the purposes intended of it, and, secondly, in order that it may not interfere with the vision of the operator of the vehicle. With the propeller located as shown and as described, the air currents generated will be directed forwardly and somewhat upwardly, with the result that any rain, sleet or snow particles will be by this air current deflected away from the windshield 6. In addition to maintaining the windshield clear by deflecting the particles away from it by means of the air current, the rapidly rotating propeller itself, of course, forms a shield for the windshield. While the propeller 5 is in Fig. 2 shown as spaced slightly from the windshield 6, in order to accommodate the upper and forward edge of the top 15, it is to be understood that the mounting of the propeller is not limited to that manner, but the propeller may be made entirely of or at least have its leading edge made of some flexible and yieldable material such as rubber, and may be mounted so that at least the leading edge of each blade of the propeller actually contacts and thus wipes off the exterior surface of the windshield 6.

For the production of the vertically directed air current operative to cause insects to be deflected over the top of the automotive vehicle, two propellers 26 are again provided, though it is believed apparent that one propeller could be employed. These propellers 26 are similar in construction to the propellers 5 and are mounted one on each side of the hood cover. The propellers 26 are mounted in the same manner as the propellers 5 and again are driven by individual motors 7. These motors are constructed in the same manner as the motor shown in Fig. 3, save that the switch 17 is located on the instrument panel of the automotive vehicle instead of directly in the casing 12. Notches 20 are again formed in the end of the motor shaft so that the propellers may be yieldably retained in a position extending longitudinally of the hood of of the automotive vehicle. With the propeller positioned longitudinally when not operating, and with the propeller made comparatively narrow, the propeller, particularly when made of some bright, non-corrosive material, appears as an ornamentation on the hood cover.

As previously stated, and as is apparent from the drawing, the propellers 26 will cause a substantially vertically directed air current and thus will deflect upwardly above the top of the motor vehicle any insect that may come within this current range. In this manner insects will be prevented from striking and from being crushed on the windshield.

The circuit connections to the various motors and the solenoid have not been shown because per se they form no part of the invention, and because they are so simple as to be readily made by any one skilled in the art.

It is believed apparent from the foregoing that I have devised a unique construction for maintaining the exterior surface of a windshield or the like free and clear, which construction operates on a principle wholly different from anything heretofore employed for that purpose. My invention provides protective curtains or currents of air which prevent foreign particles from reaching the surface to be protected, and thus is effective were other means have failed. With my invention, the entire area of the windshield is kept clear and clean even though the propeller my actually be so small as to sweep only a portion of the windshield. Furthermore, with my principle of operation, my invention is effective at all times and particularly under all temperature conditions, which conditions detrimentally affect the successful operation of any device dependent upon the removal of snow and ice once it has struck the windshield. My invention is readily installed and when not in use presents a neat, attractive and ornamental appearance.

I claim as my invention:

1. In a vehicle having a vision providing opening and a transparent glass closing the opening, means for preventing impairment of vision through the opening by the coating of the exterior of the glass as an incident to striking of the exterior of the glass by foreign particles such as sleet and snow comprising an air pressure generating device positioned at the opening outwardly of the glass setting up an air current column of a cross sectional area larger than the opening to be protected directed outwardly and away from the glass substantially at right angles thereto to deflect foreign particles away from the glass to prevent their striking the glass and including a motor for rendering operation of said device independent of movement of the vehicle or operation of the vehicle engine.

2. A windshield or other glazed vision opening protector for automotive vehicles and the like comprising a rotary air current generating member passing in front of the glazed opening to be protected and setting up an air current column directed outwardly and away from the glass substantially at right angles thereto, the extremities of said member describing and area larger than the opening to be protected, a motor connected to said member for rotating said member, and means for securely mounting said member and motor as a unit near one edge of the glazed opening of the vehicle.

3. A windshield or other glazed vision opening protector for preventing coating of the exterior of a windshield by eliminating contact of foreign particles with the windshield comprising a rotary air current generating propeller passing in front of the major portion of the opening to be protected and disposed to rotate in a plane parallel with the plane of the windshield, a motor operable independently of the movement of the vehicle for driving said propeller at a high rate of speed, and means for securing said propeller and said motor to the windshield with the propeller externally of said windshield, said propeller being adapted to be rotated by said motor in such direction as to generate an air current substantially at right angles and away from the windshield.

4. A device for protecting the exterior of a windshield or the like against foreign particles comprising a rotary propeller, a motor for rotating said propeller at a comparatively high rate, means for mounting said propeller and said motor with said propeller disposed to rotate in a plane parallel with the plane of the area to be protected, and automatically operable means for arresting and holding said propeller in a predetermined fixed position when not in operation.

5. A windshield protector for automotive vehicles and the like comprising a propeller less than twice as long as the windshield is wide, a motor for driving said propeller including an extending shaft on the free end of which said propeller is fixedly secured, and means for attaching said protector to the automotive vehicle comprising a sleeve through which the extending shaft projects and in which it is rotatably journaled, said sleeve being adapted to extend through an aperture formed in the windshield near an edge thereof and having at one end an annular flange, and nuts threadable onto the other end of said sleeve for clamping the windshield between said nuts and said annular flange.

6. A protector for the exterior surface of the windshield of an automotive vehicle comprising a rotary propeller, a motor for rotating the same housed in a casing, and means for securing the protector near the top edge of the windshield, said motor and the casing housing the same having a narrow portion adjacent the clamping means to permit positioning of the protector immediately adjacent the forward top edge of the top of the automotive vehicle.

7. A device for protecting the exterior surface of a transparent shield against coating by foreign particles comprising a rotary propeller, an electric motor for rotating said propeller at a comparatively high rate and in a direction setting up an air current tending to deflect foreign particles away from the shield to be protected, and automatically operable means for arresting and holding said propeller in a predetermined fixed position when not in operation comprising means formed on the shaft of said motor, cooperating latch means, yieldable means urging said latch means toward engagement with the means on the shaft of said motor, said latch means being operable when engaged to hold said propeller in a predetermined fixed position, part of said latch means forming an armature, and a solenoid adapted when energized to attract the armature and overcome said yieldable means to withdraw said latch means from the means on said shaft, said solenoid being connected in parallel with said motor to be energized when said motor is operating and to be deenergized when said motor is not operating.

8. In a vehicle having a windshield, means for preventing impairment of vision through the windshield by the coating of the exterior thereof as an incident to striking of the exterior of the windshield by foreign particles such as sleet, snow or insects comprising a first air pressure generating device setting up an air current directed outwardly and away from the windshield substantially at right angles to the plane of the windshield, and a second air pressure generating device mounted below and in front of the windshield setting up an air current directed upwardly in front of the windshield.

9. In a vehicle having a windshield, means for preventing impairment of vision through the windshield by the striking of the exterior of the windshield by foreign particles such as sleet, snow or insects comprising a plurality of deflectors each composed of a rotary air current generating propeller and an electric motor for driving the same, one deflector being mounted near the top of the windshield with the propeller externally of the windshield and adapted to be rotated in a direction to set up an air current directed outwardly and forwardly from the windshield, and another deflector mounted on the hood of the vehicle in front of the windshield and adapted to be rotated in a plane and in a direction to set up an air current directed upwardly and in front of the windshield.

EDWIN BAGNALL.